United States Patent [19]

Stürtz

[11] Patent Number: 5,660,670
[45] Date of Patent: Aug. 26, 1997

[54] METHOD AND APPARATUS FOR MANUFACTURING RECTANGULAR FRAMES

[75] Inventor: Karl-Heinz Stürtz, Neustadt, Germany

[73] Assignee: Willi Stürtz Maschinenbau GmbH, Neustadt, Germany

[21] Appl. No.: 437,133

[22] Filed: May 5, 1995

[30] Foreign Application Priority Data

May 11, 1994 [DE] Germany ................. 44 16 634.6

[51] Int. Cl.⁶ ............................................. B29C 65/20
[52] U.S. Cl. ........................ 156/304.2; 156/304.6; 156/309.9; 156/499; 156/580
[58] Field of Search ...................... 156/304.1, 304.2, 156/304.5, 304.6, 308.2, 309.9, 322, 499, 580, 583.1

[56] References Cited

U.S. PATENT DOCUMENTS

| | | | |
|---|---|---|---|
| 4,752,350 | 6/1988 | Schuster | 156/379.6 |
| 4,909,892 | 3/1990 | Quinn et al. | 156/499 |
| 4,971,639 | 11/1990 | Quinn et al. | 156/64 |
| 4,995,935 | 2/1991 | Ganzberger | 156/499 |
| 5,006,198 | 4/1991 | Pasquini | 156/559 |
| 5,370,835 | 12/1994 | Sturtz | 264/248 |
| 5,439,546 | 8/1995 | Brickenstein | 156/304.2 |

FOREIGN PATENT DOCUMENTS 9207639  9/1992  Germany.

Primary Examiner—James Sells
Attorney, Agent, or Firm—Friedrich Kueffner

[57] ABSTRACT

The present invention relates to a method and an apparatus for manufacturing rectangular frames of plastic material, for example, casements and door and window frames. The frames are manufactured in a vertically operating or essentially vertically operating welding machine which is equipped with four welding heads which are movable relative to each other. Four plastic sections which are cut to length at the end faces and with bevels are placed from the operator side with the use of welding pieces into the at least one welding machine. The plastic sections are then clamped in the welding machine. All mitre surfaces are then simultaneously heated and joined together under pressure and the formation of welding beads to produce a closed frame. After moving the welding heads apart, the frame is subsequently moved out of the clamping plane on the side of the welding machine facing away from the operator side and is transferred to a transport device.

5 Claims, 1 Drawing Sheet

METHOD AND APPARATUS FOR MANUFACTURING RECTANGULAR FRAMES

BACKGROUND OF THE INVENTION

1. Field of the Invention

The present invention relates to a method for manufacturing rectangular frames of plastic material, for example, casements and door and window frames. The frames are manufactured in a vertically operating or essentially vertically operating welding machine which is equipped with four welding heads which are movable relative to each other. Four plastic sections which are cut to length at the end faces and with bevels are placed from the operator side with the use of welding pieces into the at least one welding machine. The plastic sections are then clamped in the welding machine. All mitre surfaces are then simultaneously heated and joined together under pressure and the formation of welding beads to produce a closed frame. After moving the welding heads apart the frame is subsequently moved out of the clamping plane and is transferred to a transport device.

The present invention also relates to an apparatus for carrying out the above-described method.

2. Description of the Related Art

Rectangular frames, for example, casements and door and window frames, are manufactured by successively placing with the use of welding pieces four plastic sections which have been cut to length at both end faces and with bevels into a vertically operating or approximately vertically operating welding machine which is equipped with four welding heads which are movable relative to each other. The plastic sections are then aligned and clamped in the welding machine. Four plate-shaped heating units then heat the plastic sections at the mitre surfaces which face each other to a temperature which is so high that, after the heating units have been removed, the mitre surfaces are welded together with the formation of welding beads by pressing the mitre surfaces together. After a predetermined cooling period, the welded window frame is taken out of the welding machine on the operator side and is transferred to a cleaning or trimming machine in which the welding beads are processed or removed at least in the areas of the window frame which are visible. The transfer of the window frame is carried out in such a way that the frame is taken out of the welding machine in the vertical position or approximately vertical position and is transferred in this position to the subsequent cleaning or trimming machine.

DE-GM 92 07 639 discloses an apparatus for transferring the window frames from a welding machine to a cleaning or trimming machine. The apparatus includes two gripping members which are arranged spaced apart from each other and one above the other. The gripping members are used for grasping the window frame from the operator side at the upper and lower plastic sections of the frame, for moving the window frame out of the welding machine and for subsequently displacing the window frame in the plane of the frame out of the area of the welding machine. This known gripping apparatus then transfers the welded window frame to a vertical or approximately vertical transporting unit which is located laterally next to the welding machine. The transporting unit then transfers the window frame to the cleaning or trimming machine.

The above-described sequence of steps has the result that the operator side of the welding machine is blocked by the gripping apparatus during the removal of the window frame from the welding machine and during the time the window frame is moved away to the side. In other words, during this time it is not possible to place more plastic sections into the welding machine for producing another window frame. This has a negative effect on the work cycle of the welding machine. In the apparatus according to DE-GM 92 07 639, this disadvantage is avoided by arranging at least two four-head welding machines on a revolving unit, wherein the gripping apparatus alternatingly services the two welding machines. However, such a revolving unit with at least two four-head welding machines is relatively expensive.

SUMMARY OF THE INVENTION

Therefore, it is the primary object of the present invention to provide a method and an apparatus for manufacturing rectangular frames which make it possible within an extremely short time after the welding of a frame of plastic sections, particularly a window frame, to place more plastic sections into the welding machines for forming the next frame. The purpose is to reduce the time required for manufacturing a welded frame and to increase the number of cycles per unit of time of the welding machine.

In accordance with the present invention, in a method of the above-described type, the welded frame is removed from the welding machine on the side of the welding machine facing away from the operator side.

The method according to the present invention makes it possible that the operator side of the welding machine is completely free when the frame is removed, so that more plastic sections can be placed in the welding machine as soon as the welded frame has been removed from the welding machine. The method according to present invention makes it possible to significantly increase the number of frames welded per unit of time. As a result, the output of a welding machine can now come closer to the output of a subsequent cleaning or trimming machine. Although an operator is still required for placing the plastic sections into the welding machine, the operator is now utilized better and the labor cost of a welded frame is reduced.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
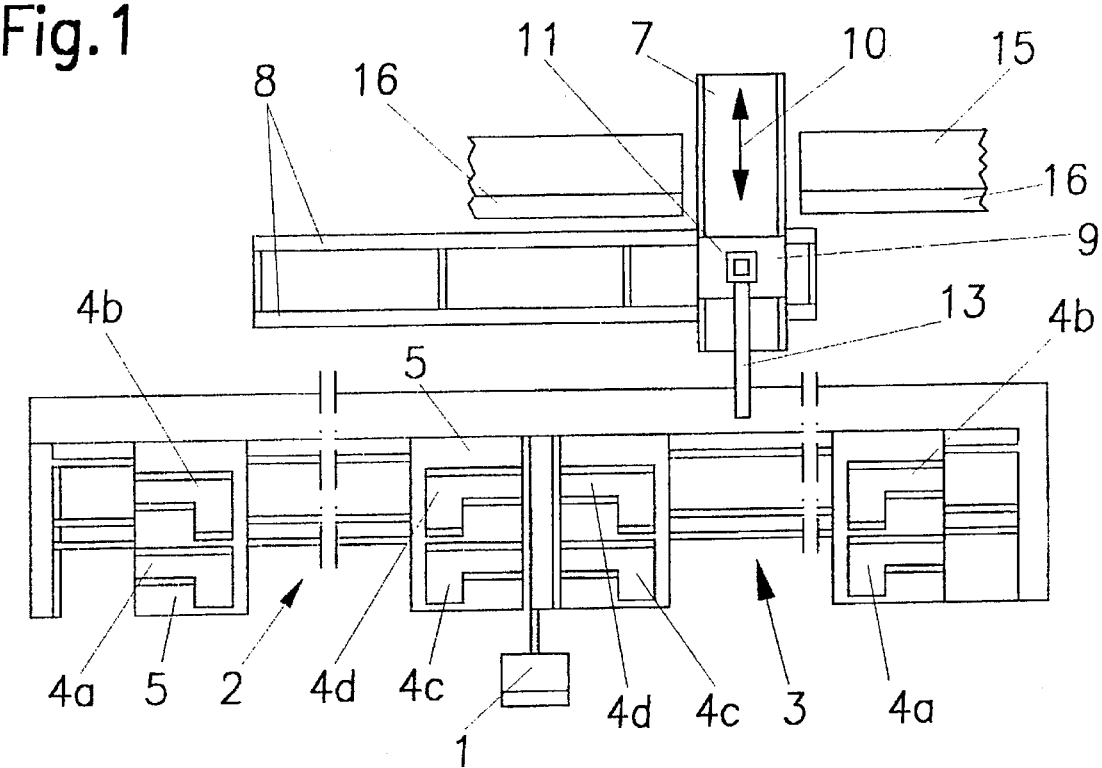
FIG. 1 is a schematic top view of an apparatus according to the present invention for manufacturing a welded frame.

The drawing schematically shows a portion of an automatic production plant for manufacturing casements and door and window frames of plastic material. In accordance with an advantageous feature, the manufacturing plant is controlled by a central computer. FIG. 1 of the drawing only shows the operating panel 1 of the central computer.

In the illustrated embodiment, the manufacturing plant includes two welding machines which are arranged directly next to each other. Each welding machine has four welding heads 4a, 4b, 4c and 4d. Always two welding 4a, 4b and 4c, 4d, respectively, are supported by a slide 5 each, wherein one of the slides 5 may be stationary, while the other slide is slidable on horizontal guide members. The respectively lower welding head 4a, 4c is mounted stationary on each slide 5, while the respectively upper welding head 4b, 4d can be raised and lowered. The movable slide 5 and the vertically movable welding heads 4b, 4d can be moved into the respective positions of operation by means of conventional drives, not shown in the drawing.

In the illustrated embodiment, the welding heads 4a, 4b and 4c, 4d, respectively, located above each other, are arranged laterally offset relative to each other, so that the frame to be manufactured does not assume an exactly vertical position but rather a position which is inclined, for example, by an angle of 15°. This position ensures that the window frame cannot tilt after the clamping elements have been released. It is essentially also possible to arrange the welding heads 4a, 4b and 4c, 4d in such a way that the finished frame assumes an exactly vertical position. However, in that case, it is necessary to provide a separate unit for securing the frame against tilting.

The further description of the method below starts from the point in time in which the welding machine 2 is empty, while an already welded window frame 6 is cooling in the welding machine 3. After the welding heads 4a to 4d of the welding machine 2 have been moved into a predetermined position, the plastic sections which have been cut to length and with a bevel are placed in the welding heads 4a to 4d and are clamped. Each welding head 4a to 4d has so-called welding pieces which are adapted to the cross sectional shape of the plastic sections. After the plastic sections have been clamped, a heating blade each is inserted between the mitre surfaces of the plastic sections which face each other and the plastic sections are moved by the welding heads 4a to 4d until all mitre surfaces of the plastic sections are in contact with the heating blades and can be heated to such an extent that, after the heating blades have been removed, the plastic sections are welded together with the formation of a welding bead by moving the welding heads 4a through 4d further toward each other under pressure.

A carriage 7 is arranged behind the two welding machines 2 and 3. The carriage 7 is movable on rails 8 parallel to the two welding machines 2 and 3. The carriage 7 carries a slide 9 which is slidable over a guide means in the direction of double arrow 10. The carriage 7 and the slide 9 are moved by means of drives, not shown in the drawing.

Figure 2:
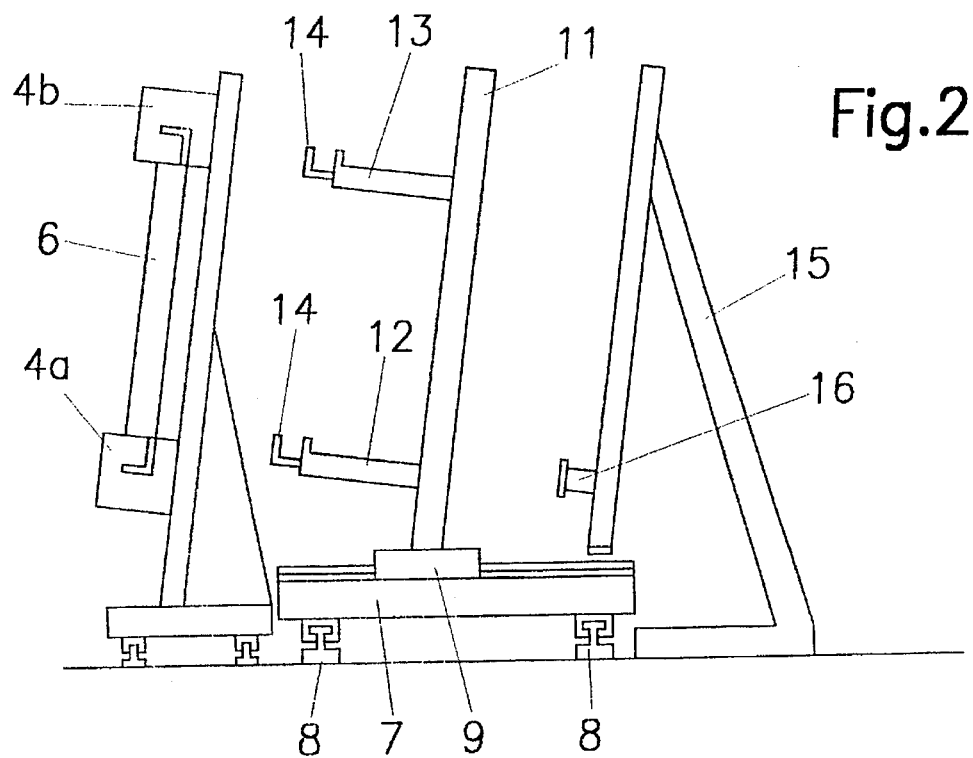
FIG. 2 is a schematic side view of the apparatus of FIG. 1.

The slide 9 supports a vertical guide rail 11. In the illustrated embodiment, the guide rail 11 also assumes an inclined position, as shown in FIG. 2. The inclination of the guide rail 11 corresponds exactly to the inclined position of the frame 6 in the welding heads 4a to 4d. Two gripping members 12 and 13 are mounted on the guide rail 11 in the conventional manner, not illustrated in the drawing. The gripping members 12 and 13 are spaced apart from each other and are raisable and lowerable, wherein the lower gripping member 12 carries out only a relatively short lifting movement, while the upper gripping member 13 is movable so as to be able to compensate for the different heights of various frames 6. Each gripping member 12, 13 is equipped with a gripping arm 14 which can be displaced by means of a piston-cylinder unit, not shown.

For removing a finished welded frame 6 out of the welding machine 3, the slide 9 is moved on the carriage 7 until the two gripping members 12, 13 are each located underneath a frame component. The two gripping members 12, 13 are now moved slightly upwardly until the frame components rest on the gripping arms 14. Once the frame components rest on the gripping arms 14, the welding heads 4a to 4d are moved apart until the welded frame 6 is completely released and is only held be the gripping arms 14. The frame 6 can now be clamped on the gripping members 12, 13 by means of the gripping arms 14. After clamping, the slide 9 is again moved downwardly and the welded frame 6 is moved on the slide 9 out of the welding machine 3. At this moment, the welding machine 3 is immediately ready to receive additional plastic sections for forming another frame 6.

The frame 6 which has been removed from the welding machine 3 is now moved on the carriage 9 by means of the gripping members 12 and 13 into the area of a transporting unit 15 which is only schematically illustrated in the drawing. In order to facilitate a movement of the slide 9 with the guide rail 11, the transporting unit 15 has an opening or a cutout, so that the welded frame 6 can be moved onto the transporting unit 15 and placed in the transporting unit 15, for example, a schematically indicated conveyor belt 16. Of course, in order to carry out this step, the gripping arms 14 are opened and the gripping members 12 and 13 are lowered. The slide 9 with its guide rail 11 is now moved further back by a small distance, so that the frame 6 which is now on the transporting unit 15 can be transported away in its plane without impairment by the gripping members 12 and 13 and moved, for example, into a cleaning or trimming machine. The slide 9 with its guide rail 11 now returns into the initial position shown in FIG. 1. During the movement of the frame 6 out of the welding machine 3 and the transfer of the frame 6 to the transporting unit 15, the frame 6 manufactured in the welding machine 2 is finished and cooled down to such an extent that it can be removed. The carriage 7 is now moved on the guide means 8 toward the left as seen in FIG. 1 until the frame 6 manufactured in the welding machine 2 can also be removed toward the rear by means of the gripping members 12 and 13 and can be transferred to the transporting unit 15.

Of course, the removal of the frame 6 in the manner described above is also possible when only one welding machine 2 or 3 is provided. The welded frames 6 may also be transferred to the transporting unit 15 without the use of movable gripping members 12, 13. In that case, it is necessary that the transporting unit 15 is arranged only a small distance behind the welding machines 2, 3. It is merely necessary to provide slightly inclined guide bars which briefly support the finished frame 6 when it is transferred to the transporting unit 15.

Another possibility for transferring the frame 6 to the transporting unit 15 is to provide a tilting table behind the welding machine 2 and 3 for tilting the welded frame 6 into a horizontal position. However, the transporting unit 15 must also constructed as a horizontal transporting unit. Another possibility is to arrange the welding heads 4a to 4d in a so-called portal which also facilitates a removal of the welded frame 6 toward the rear. The welding heads may also be constructed as double welding heads. This means that simultaneously two frames 6 can be welded in a welding machine 2, 3.

The invention is not limited by the embodiments described above which are presented as examples only but can be modified in various ways within the scope of protection defined by the appended patent claims.

I claim:

1. A method for manufacturing rectangular frames of plastic material in at least one vertically operating or essentially vertically operating welding machine equipped with four welding heads which are movable relative to each other, the method comprising placing four plastic sections which are cut to length with bevels at end faces thereof from an operator side into the at least one welding machine, clamping the plastic sections in the welding machine in a clamping plane, heating all end faces simultaneously and joining the end faces together under pressure and with the formation of welding beads to join the four plastic sections together to form a closed welded frame, moving the welding heads apart, subsequently moving the frame out of the clamping plane on a side of the at least one welding machine facing away from the operator side, and transferring the frame to a transport device.

2. The method according to claim 1, wherein the transport device is a horizontal transport device, further comprising transferring the welded frame to a tilting table, tilting the frame into a horizontal position and transferring the frame to the horizontal transport device.

3. The method according to claim 1, wherein the frame is transferred to an essentially vertical transport device.

4. The method according to claim 1, wherein the transport device is a vertical or essentially vertical transport device, further comprising initially grasping the welded frame by a gripping means, displacing the frame parallel in its plane and finally transferring the frame to the transport device.

5. The method according to claim 1, comprising manufacturing the frames in two welding machines, the two welding machines being arranged spaced apart from each other and next to each other, further comprising alternatingly removing the welded frames from the two welding machines.

* * * * *